April 13, 1926.
F. C. HEYLMAN
DOUBLE PACKED STOP COCK
Filed June 1, 1925
1,580,248
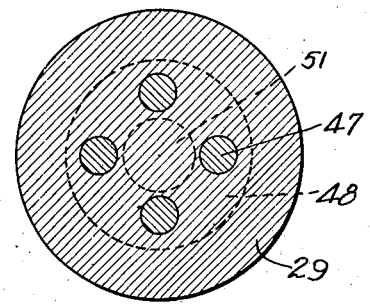
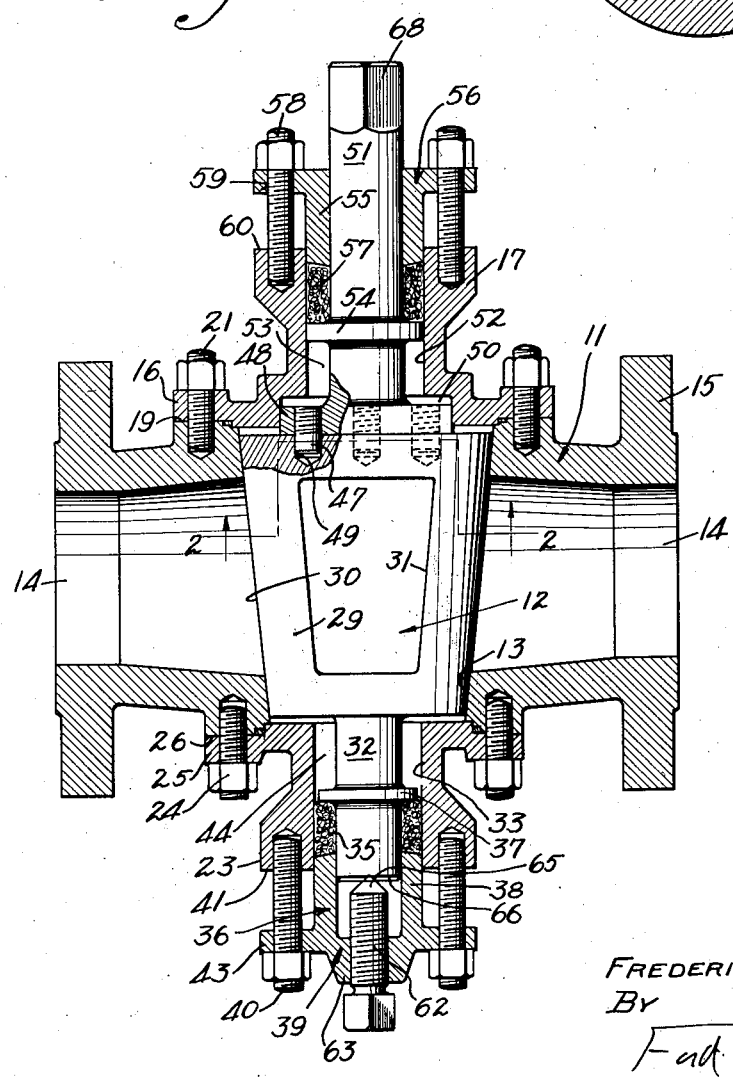
INVENTOR:
FREDERICK C. HEYLMAN,
BY
ATTORNEY.

Patented Apr. 13, 1926.

1,580,248

UNITED STATES PATENT OFFICE.

FREDERICK C. HEYLMAN, OF MARTINEZ, CALIFORNIA.

DOUBLE-PACKED STOP COCK.

Application filed June 1, 1925. Serial No. 34,106.

*To all whom it may concern:*

Be it known that I, FREDERICK C. HEYLMAN, a subject of the Queen of Holland, residing at Martinez, in the county of Contra Costa, State of California, have invented a new and useful Double-Packed Stop Cock, of which the following is a specification.

This invention relates to a novel form of stop cock.

A standard form of stop cock comprises a body which provides a conical seat to which passages join. A conical plug engages a conical seat, this plug having an opening therethrough which permits a passage of fluid through the body when it is in alignment with the passages of this body. A valve stem extends from the conical plug through a bonnet secured to the body. A stuffing box is carried by the body surrounding the valve stem. The stuffing box serves two purposes, first to prevent leakage from the cock around the stem and, second, to retain the plug in proper seated position. In practice, considerable trouble is encountered in a cock of this construction. If the packing is tight enough to prevent leakage, the plug is forced against the seat with such pressure that it tends to bind, and in some instances it is necessary to disassemble the cock in order to remove the binding. This deficiency in some instances has caused a great deal of trouble due to the fact that a cock could not be shut off in an instant.

It is an object of my invention to provide a stop cock which may be readily assembled or disassembled for cleaning, repairing and inspection.

It is a further object of my invention to provide a means for adjusting the plug of the stop cock into proper working position so that it will not bind or tend to leak.

It is a still further object of my invention to provide a plug and operating stem which are separate parts.

It is another object of my invention to provide a means for freeing the plug should it become bound.

Other objects and the salient advantages of my invention will be made evident hereinafter.

Referring to the drawing in which I illustrate a preferred form of my invention:

Fig. 1 is a sectioned view of a stop cock having the features of my invention.

Fig. 2 is a section taken on the line 2—2 of Fig. 1.

The form of my invention shown in the drawings comprises a body 11 having a plug chamber 12 which is surrounded by a conical plug seat 13. Connected to the chamber 12 are passages 14 which connect to the exterior of the body through flanges 15 thereof. A flange 16 of an upper bonnet 17 is secured to an upper face 19 of the body 11 by stud bolts 21. A lower bonnet 23 is secured to the body 11 by stud bolts 24 which clamp a flange 25 of the lower bonnet 23 against a face 26 of the body 11.

Placed in the plug chamber 12 is a plug 29 having a conical outer face 30 which engages the conical seat 13 and which has an opening 31 formed therethrough. A spindle 32 extends from the lower smaller end of the plug 29 and through an opening 33 of the lower bonnet 23. Packing 35 of a stuffing box 36 is compressed between a flange 37 of the spindle 32 and a cylindrical projection 38 of a gland 39. The gland 39 is caused to compress the packing 35 by pressure placed thereon by stud bolts 40 which extend from a face 41 of the lower bonnet 23 through ears 43 of the gland 39. A cooling space 44 is formed in the opening 33 of the bonnet 23 between the plug 29 and the flange 37.

Pins carried by a disc 48 extend into openings 49 formed in the upper part of the plug 29. The disc 48 is situated in a cylindrical recess 50 and is formed at the lower end of a valve stem 51 which extends through an opening 52 in the upper bonnet 17. A cooling space 53 is formed in the lower part of the opening 52 between the disc 48 and a flange 54 formed on the stem 51. A gland 55 of the stuffing box 56 compresses packing 57 against the flange 54. Stud bolts 58 extending through ears 59 of the gland 56 clamp this gland against packing 57, these bolts 58 extending from an upper face 60 of the upper bonnet 17.

An adjustment member in the form of a set screw 62 is threadably carried in a hub 63 of the gland 39 of the lower stuffing box 36. A conical end 65 of this set screw 62 engages a lower end 66 of the spindle 32. In Fig. 1 it is shown that a small space exists in the plug chamber 12 below the plug 29 and also a small space exists above the plug 29 and above the disc 48. When the valve is put into operation, the stuffing boxes 36 and 56 are tightened so as to provide a tight seal around the spindle 32 and the valve stem 51. The set screw 62 is adjusted so that it moves the plug 29 into a proper operating position, that is, into such a position that it will not bind yet not tend to leak. The stuffing boxes may be made as tight as thought desirable due to the fact that their tightness will in no way affect the operating position of the plug and therefore cause the plug to bind. The plug 29 is shown in closed position in Fig. 1. It may be rotated into open position by the application of a wrench to an upper polygonal portion 68 of the valve stem 51.

The parts of the stop cock of my invention are all constructed so that they may be readily disassembled so it may be cleaned or repaired. Stop cocks are sometimes used in pipe lines carrying viscous and sticky substances, and must, therefore, be frequently cleaned. The plug 29 and the body 11 are made of different materials so that the tendency of the plug to freeze in the body is lessened, it being found from experience that when the plug and the body are of the same material, there is a tendency for freezing of these parts. The valve stem 51 is made a separate part from the plug 29 to make the assembling of the valve easy and also so that it may be made from tool steel. The valve stem may, therefore, be of a smaller diameter to decrease the area exposed to the packing, at the same time maintaining sufficient strength to withstand the torque necessary to operate the plug 29. The cooling chambers 44 and 53 are provided to protect the packing materials 35 and 57 from heat.

Stop cocks are used extensively on lines carrying substances which are of high temperature. In the ordinary cock the packing becomes very hot, which is obviously detrimental thereto. In my stop cock, a great deal of packing trouble is eliminated by virtue of the cooling spaces 44 and 53.

The adjustment screw 62 not only serves as a means for maintaining the plug 29 in proper working position, but it also serves as a means for freeing the plug if it becomes bound. This is easily accomplished by first loosening the gland 55 of the stuffing box 56 and then advancing the adjustment screw 62 upwardly against the stem 32. This results in an upward movement of the plug 29 which frees it from the seat 13. The plug 29 and the valve stem 51 are free to move upwardly due to the spaces provided in the plug chamber 12 and the disc cavity 50.

I claim as my invention:

1. A stop cock comprising: a body having a conical seat with which passages connect; an upper bonnet secured to said body at the upper end of said conical seat; a lower bonnet secured to said body at the lower end of said conical seat; a conical plug placed in engagement with said conical seat; a spindle extending through said lower bonnet from the lower apex end of said plug; a lower stuffing box carried by said lower bonnet, surrounding said spindle; a stem extending through said upper bonnet; an upper stuffing box carried by said upper bonnet, surrounding said stem; and means for connecting said stem to the upper base end of said conical plug.

2. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem to the upper end of said plug; and means in engagement with said spindle for adjusting the position of said plug.

3. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem to the upper end of said plug; and means adapted to engage said spindle in a manner to free said plug should it become bound.

4. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; and means for forming cooling spaces between said plug and said upper and lower stuffing boxes.

5. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; means in engagement with said spindle for adjusting the position of said plug; and means for forming cooling spaces between said plug and said upper and lower stuffing boxes.

6. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; means adapted to engage said spindle in a manner to free said plug should it become bound; and means for forming cooling spaces between said plug and said upper and lower stuffing boxes.

7. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; and means carried by the gland of said lower stuffing box in engagement with said spindle for adjusting the position of said plug.

8. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; and means carried by the gland of said lower stuffing box adapted to engage said spindle in a manner to free said plug should it become bound.

9. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet; surrounding said spindle; a stem extending through said upper bonnet; an upper stuffing box carried by said upper bonnet, surrounding said stem; means for connecting said stem and said plug together; means carried by the gland of said lower stuffing box adapted to engage said spindle in a manner to free said plug should it become bound; and means for forming cooling spaces between said plug and said upper and lower stuffing boxes.

10. A stop cock comprising: a body having conical seat with which passages connect; an upper bonnet secured to said body at the upper end of said conical seat; a lower bonnet secured to said body at the lower end of said conical seat; a conical plug placed in engagement with said conical seat; a spindle extending through said lower bonnet from the lower apex end of said plug; a lower stuffing box carried by said lower bonnet, surrounding said spindle; a stem extending through said upper bonnet; an upper stuffing box carried by said upper bonnet, surrounding said stem; a disc formed at the lower end of said stem; and means connecting said disc to the upper base end of said conical plug.

11. A stock cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; a disc formed at the lower end of said stem; pins connecting said disc to the upper end of said plug; and means in engagement with said spindle for adjusting the position of said plug.

12. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; a disc formed at the lower end of said stem; pins connecting said plug and said disc together; and means for forming cooling spaces between said plug and said upper and lower stuffing boxes.

13. A stop cock comprising: a body having a conical seat with which passages connect; an upper bonnet secured to said body at the upper end of said conical seat; a lower bonnet secured to said body at the lower end of said conical seat; a conical plug placed in engagement with said conical seat; a spindle extending through said lower bonnet from the lower apex end of said plug; a lower stuffing box carried by said lower bonnet, surrounding said spindle; a stem extending through said upper bonnet; an upper stuffing box carried by said upper bonnet, surrounding said stem; a disc formed at the lower end of said stem; and pins operatively connecting said disc to the upper base end of said conical plug.

14. A stop cock comprising: a body having a conical seat with which passages connect; an upper bonnet secured to said body at the upper end of said conical seat; a plug placed in engagement with said conical seat; a spindle extending through the body from the lower end of said plug; a lower stuffing box surrounding said spindle; a stem extending through said upper bonnet; an upper stuffing box carried by said upper bonnet surrounding said stem; and means for forming enclosed cooling spaces between said plug and said upper and lower stuffing boxes.

15. A stop cock comprising: a body having a conical seat with which passages connect; an upper bonnet secured to said body at the upper end of said conical seat; a lower bonnet secured to said body at the lower end of said conical seat; a plug placed in engagement with said conical seat; a spindle extending through said lower bonnet from the lower end of said plug; a lower stuffing box carried by said lower bonnet, surrounding said spindle; a stem extending through said upper bonnet; an upper stuffing box carried by said upper bonnet, surrounding said stem; means for connecting said stem and said plug together; a set screw carried by the gland of said lower stuffing box adapted to engage said spindle in a manner to free said plug should it become bound; and means for forming cooling spaces between said plug and said upper and lower stuffing boxes.

In testimony whereof, I have hereunto set my hand at Martinez, California, this 23rd day of May, 1925.

FREDERICK C. HEYLMAN.